(12) United States Patent
Bamba

(10) Patent No.: US 10,474,918 B2
(45) Date of Patent: Nov. 12, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yasuo Bamba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 362 days.

(21) Appl. No.: 15/047,416

(22) Filed: Feb. 18, 2016

(65) Prior Publication Data

US 2016/0253579 A1 Sep. 1, 2016

(30) Foreign Application Priority Data

Feb. 26, 2015 (JP) .................................. 2015-037432

(51) Int. Cl.
| | |
|---|---|
| *G06K 9/20* | (2006.01) |
| *G06K 9/00* | (2006.01) |
| *G06T 11/00* | (2006.01) |

(52) U.S. Cl.
CPC ....... *G06K 9/2081* (2013.01); *G06K 9/00771* (2013.01); *G06T 11/00* (2013.01); *G06T 2210/12* (2013.01)

(58) Field of Classification Search
USPC ........................................ 382/103, 209, 217
See application file for complete search history.

(56) References Cited

U.S. PATENT DOCUMENTS

| | | | | |
|---|---|---|---|---|
| 7,409,076 B2* | 8/2008 | Brown | ............... | G06K 9/00778 348/169 |
| 7,674,052 B2* | 3/2010 | Hirooka | ........... | G08B 13/19606 396/427 |
| 8,218,816 B2* | 7/2012 | Sonoura | .................... | G06K 9/32 382/103 |
| 8,238,603 B1* | 8/2012 | Golan | ............... | G06K 9/00778 348/169 |
| 8,472,715 B2* | 6/2013 | Yokomitsu | .............. | B61L 23/00 382/103 |
| 8,630,455 B2* | 1/2014 | Ran | ..................... | G06K 9/00778 348/143 |
| 8,897,492 B2* | 11/2014 | Chou | ........................ | G07C 9/00 382/103 |
| 9,367,734 B2* | 6/2016 | Adachi | .............. | G06K 9/00362 |
| 9,875,408 B2* | 1/2018 | Adachi | .............. | G06K 9/00771 |
| 9,904,865 B2* | 2/2018 | Kusumoto | ......... | G06K 9/00771 |

(Continued)

FOREIGN PATENT DOCUMENTS

| | | |
|---|---|---|
| JP | H09-330415 A | 12/1997 |
| JP | 2000-115750 A | 4/2000 |

(Continued)

*Primary Examiner* — Ishrat I Sherali

(74) *Attorney, Agent, or Firm* — Canon U.S.A., Inc. IP Division

(57) ABSTRACT

An image processing apparatus includes an input unit that inputs an image, a detection unit that detects an object from the image input by the input unit, and an image determination unit that determines, based on a result of detection of the object performed by the detection unit on the image input by the input unit a reference image that is to be displayed on a display screen allowing a user to specify an image processing region.

16 Claims, 10 Drawing Sheets

(56) References Cited

U.S. PATENT DOCUMENTS

| | | | | |
|---|---|---|---|---|
| 2007/0217780 A1* | 9/2007 | Hirooka | ............ | G08B 13/19606 396/287 |
| 2008/0212099 A1* | 9/2008 | Chen | ......................... | G06T 7/20 356/408 |
| 2011/0285846 A1* | 11/2011 | Lee | .................. | G08B 13/19652 348/143 |
| 2014/0119594 A1* | 5/2014 | Chou | ....................... | G07C 9/00 382/103 |

FOREIGN PATENT DOCUMENTS

| | | | |
|---|---|---|---|
| JP | 2008-016897 | A | 1/2008 |
| JP | 2009-236569 | A | 10/2009 |
| JP | 2011-128816 | A | 6/2011 |
| JP | 2012-118790 | A | 6/2012 |
| JP | 2014-116912 | A | 6/2014 |
| JP | 2014-236312 | A | 12/2014 |
| JP | 2015-018340 | A | 1/2015 |

\* cited by examiner

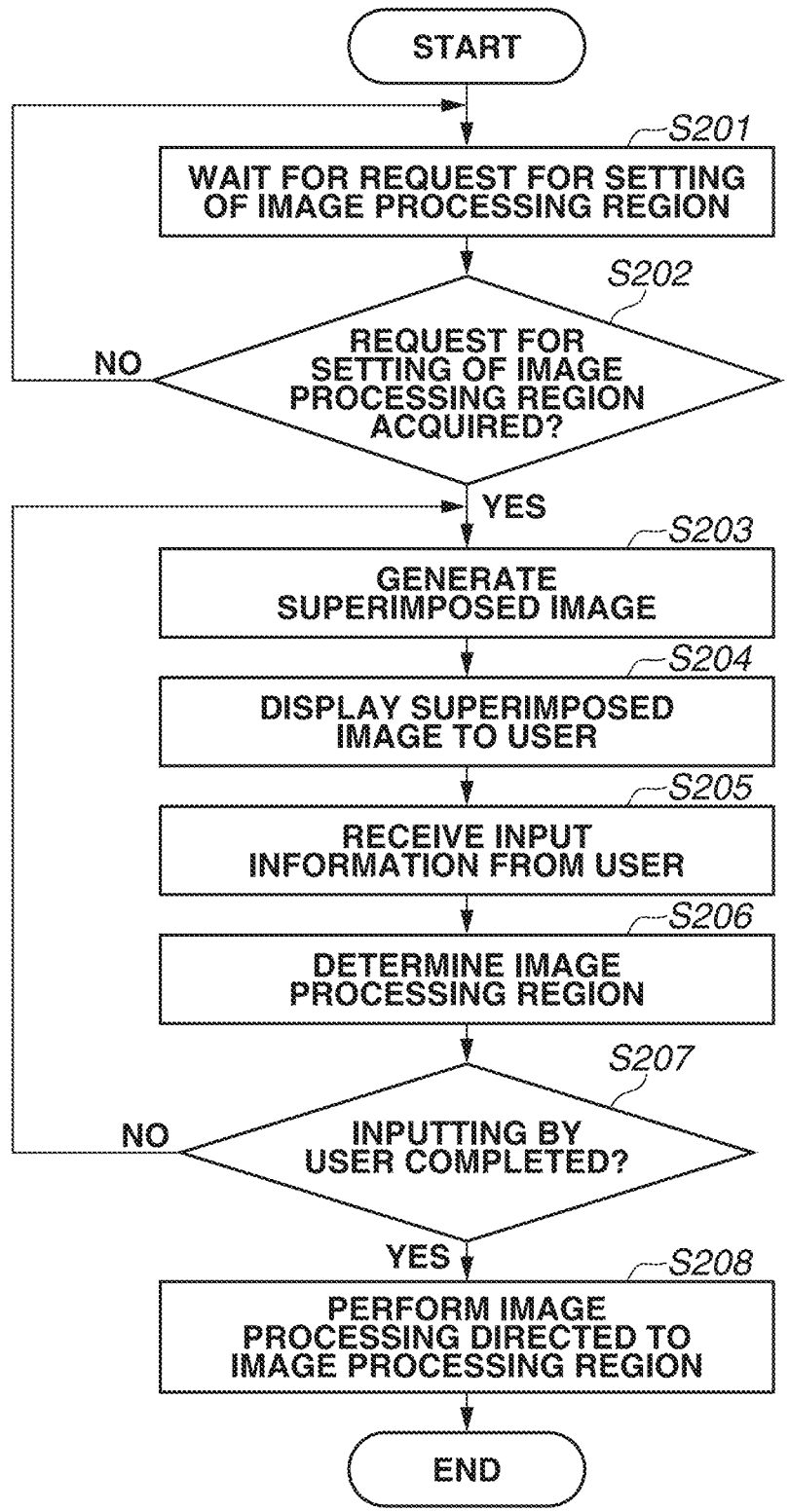

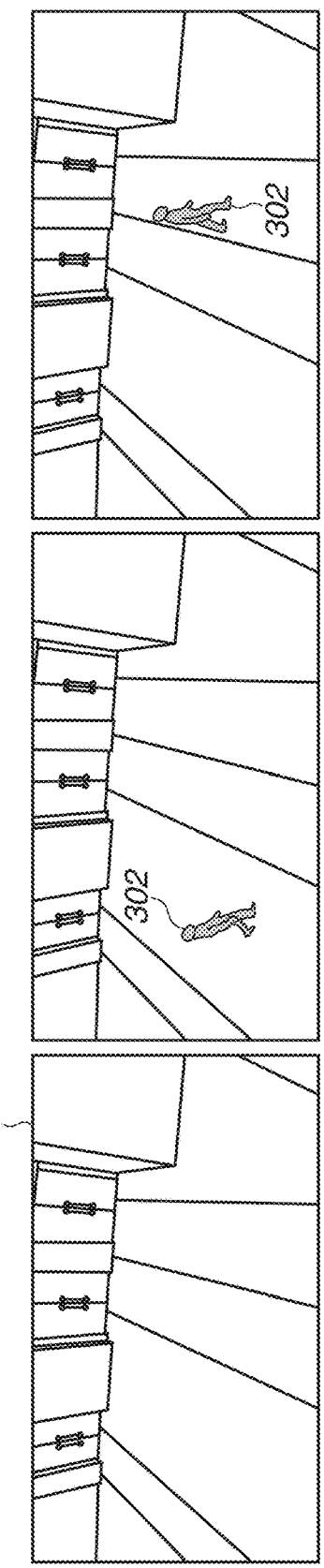
FIG. 4A  FIG. 4C  FIG. 4E
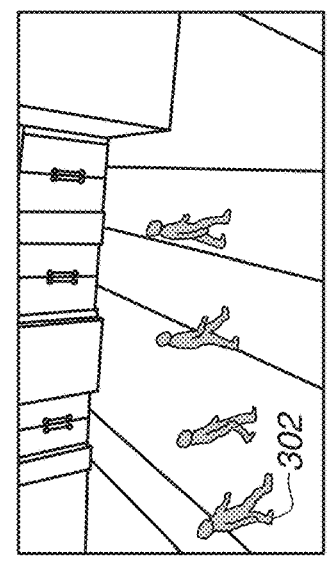
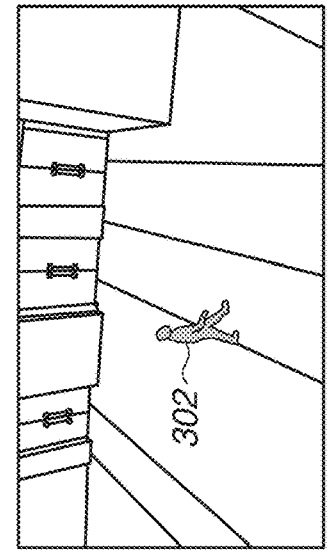
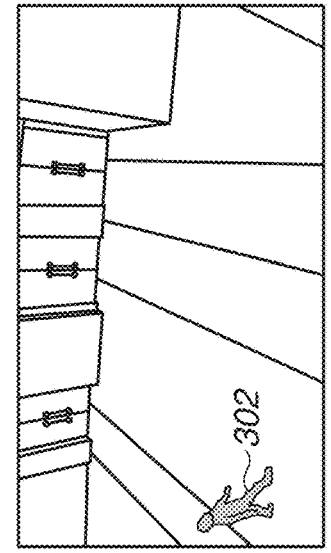
FIG. 4B  FIG. 4D  FIG. 4F

IMAGE PROCESSING APPARATUS, IMAGE PROCESSING METHOD, AND STORAGE MEDIUM

BACKGROUND

Field

Aspects of the present invention generally relate to an image processing apparatus, an image processing method, and a storage medium each of which is capable of performing image processing on a specified image processing region.

Description of the Related Art

The usage of a monitoring system includes performing various image processing operations on a video image captured by a camera to acquire various pieces of useful information. A region to which to apply image processing can be set to a part of a video image that is captured by a camera, and the image processing can be applied to only the set region.

Japanese Patent Application Laid-Open No. 2000-115750 discusses previously setting a dwell detection region to, for example, the entrance or exit platform of an escalator and performing dwell detection at the dwell detection region.

However, in some cases, it may be difficult to specify an image processing region in the same way as intended by the user. For example, consider a case where the user intends to specify an image processing region for detecting a human body staying in front of the cash desk in a store and image processing is performed based on a result of detection of the head of a person. In this case, the user is required to specify a region in which the head of a person staying in front of the cash desk is included from among the whole region of a video image captured by the camera.

However, when the user specifies such an image processing region for dwell detection as that described above, a person is not always present in front of the cash desk. It may be difficult for the user to specify an image processing region for dwell detection while viewing a captured video image in which no person is present in front of the cash desk. Even if the user has specified an image processing region, a faulty detection may occur.

SUMMARY

According to an aspect of the present invention, an image processing apparatus includes an input unit configured to input an image, a detection unit configured to detect an object from the image input by the input unit, and an image determination unit configured to determine, based on a result of detection of the object performed by the detection unit on the image input by the input unit, a reference image that is to be displayed on a display screen allowing a user to specify an image processing region.

Further features of aspects of the present invention will become apparent from the following description of exemplary embodiments with reference to the attached drawings.

BRIEF DESCRIPTION OF THE DRAWINGS

FIG. 3 is a flowchart illustrating an operation of the image processing apparatus according to the exemplary embodiment.

FIGS. 4A, 4B, 4C, 4D, 4E, and 4F illustrate a relationship between a series of captured images and a reference image according to the exemplary embodiment.

DESCRIPTION OF THE EMBODIMENTS

Figure 1:
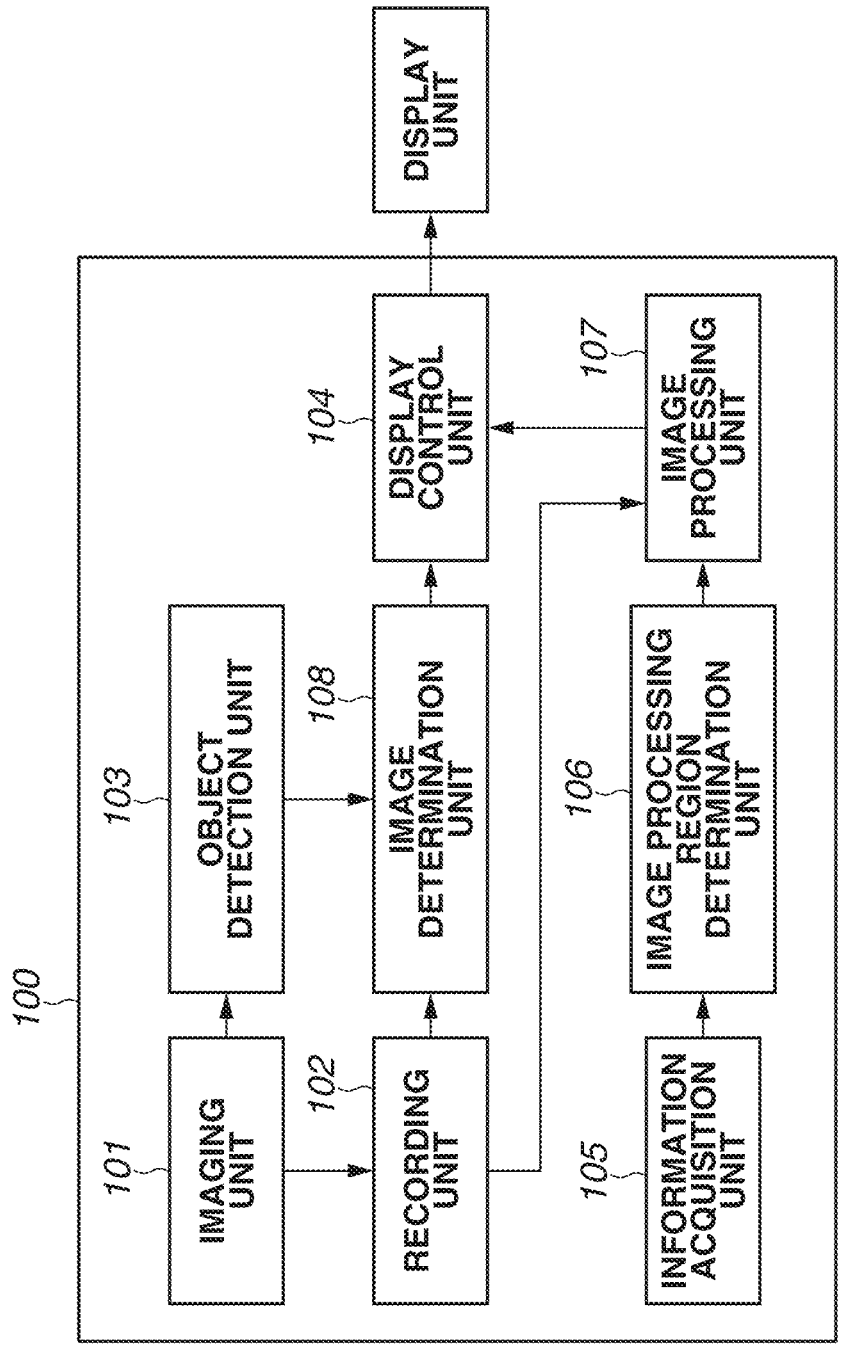
FIG. 1 illustrates an example of a configuration of an image processing apparatus according to an exemplary embodiment.

Various exemplary embodiments, features, and aspects of the invention will be described in detail below with reference to the drawings. FIG. 1 illustrates an example of a configuration of an image processing apparatus 100 according to an exemplary embodiment.

The image processing apparatus 100 includes an imaging unit 101, a recording unit 102, an object detection unit 103, a display control unit 104, an information acquisition unit 105, an image processing region determination unit 106 (hereinafter referred to as a "region determination unit 106"), an image processing unit 107, and an image determination unit 108. The image processing apparatus 100 according to the present exemplary embodiment is, for example, a network camera. More specifically, the image processing apparatus 100 is capable of performing image processing on a captured image and providing a combination of a result of the image processing and the captured image to a client device connected to a network. However, the image processing apparatus 100 is not limited to a network camera, but may be, for example, a recording server or may be a personal computer or smartphone. In a case where the image processing apparatus 100 is implemented with, for example, a recording server, the image processing apparatus 100 includes an image acquisition unit in place of the imaging unit 101.

The imaging unit 101 captures an image by controlling a solid-state image sensor, such as a complementary metal-oxide semiconductor (CMOS) sensor or a charge-coupled device (CCD) sensor, to acquire image data. Each image frame acquired by image capturing performed by the imaging unit 101 is then recorded on the recording unit 102.

The recording unit 102 encodes image data acquired by image capturing performed by the imaging unit 101 with the use of an adequate coding system and stores the encoded image data. The coding system includes, for example, Joint Photographic Experts Group (JPEG), Moving Picture Experts Group (MPEG)-2, MPEG-4, and H.264. Thus, the recording unit 102 records a plurality of image frames encoded with a predetermined coding system.

The object detection unit 103 performs processing for detecting a predetermined object (an object of interest) on image data (an image frame) obtained by image capturing performed by the imaging unit 101. In the present exemplary embodiment, an example is principally described in which the predetermined object is a person and the object detection unit 103 detects a person with the use of a head detector. However, the predetermined object (object of interest) is not limited to a person, but may be an automobile, an animal, or a moving object, or a combination of those objects. Furthermore, the object detection unit 103 may detect a person with the use of a face detector or a human body detector in place of the head detector. Moreover, without the limited use of a pattern recognition-based or machine learning-based method using a face detector or head detector, the object detection unit 103 can detect a person using an arbitrary combination of moving object detectors each of which detects a moving object based on a difference between a background image and a latest image. A result of detection of a moving object by the object detection unit 103 is passed to the image determination unit 108.

The image determination unit 108 determines a reference image using one or a plurality of image frames recorded on the recording unit 102. While details are described below, the reference image in the present exemplary embodiment is an image displayed to allow the user to specify an image processing region, and is, for example, such an image as that illustrated in FIG. 5A. The image determination unit 108 can generate a reference image from a plurality of image frames obtained by image capturing performed by the imaging unit 101, or can determine, as a reference image, an image in which the number of detected objects satisfies a predetermined condition among the plurality of image frames. The reference image determined by the image determination unit 108 is then displayed on a display unit via the display control unit 104. In the present exemplary embodiment, the display unit is connected to the image processing apparatus 100 via a network. However, the display unit may be integrated with the image processing apparatus 100. The details of a method for setting and a method for determining a reference image by the image determination unit 108 are described below.

The information acquisition unit 105 receives input information corresponding to a user operation performed on a display screen on which the above-mentioned reference image is displayed. The details of the input information, which is acquired by the information acquisition unit 105, are described below.

The region determination unit 106 determines an image processing region, which is targeted for image processing, based on the input information acquired by the information acquisition unit 105. The details of the region determination unit 106 are described below.

The image processing unit 107 performs image processing, such as congestion detection or dwell detection, on an image processing region that is set by the region determination unit 106. The image processing is not limited to congestion detection or dwell detection, but may be, for example, congestion degree detection, dwell degree detection, passage detection, removed object detection, abandoned object detection, or intrusion detection. Moreover, congestion detection in the present exemplary embodiment is image processing for detecting that objects (human bodies) the number of which is equal to or greater than a threshold value corresponding to the area of the image processing region have been detected. Additionally, congestion degree detection is image processing for detecting a congestion degree corresponding to the ratio of the number of objects (human bodies) to the area of the image processing region. Furthermore, dwell detection in the present exemplary embodiment is image processing for detecting that the same object (the same person) continues being present within the image processing region for a predetermined time threshold or more. Moreover, dwell degree detection is image processing for detection a dwell degree corresponding to a time for which the same object continues being present within the image processing region. Additionally, passage detection is image processing for detecting that, for example, an object has passed over a detection line specified by a user's instruction. Furthermore, removed object detection is processing for detecting that an object (a person) has carried away a predetermined object, and abandoned object detection is image processing for detecting that an object (a person) has deserted a predetermined object.

The display control unit 104 in the present exemplary embodiment displays the above-described reference image on the display unit so as to allow the user to specify an image processing region targeted for the above-described image processing. This enables the user to more easily set an image processing region intended by the user. Furthermore, in a case where passage detection is set as the image processing, a detection line is specified by the user as an image processing region. Thus, the image processing region in the present exemplary embodiment can be in the form of a closed region or a line segment depending on the content of image processing.

Figure 2:
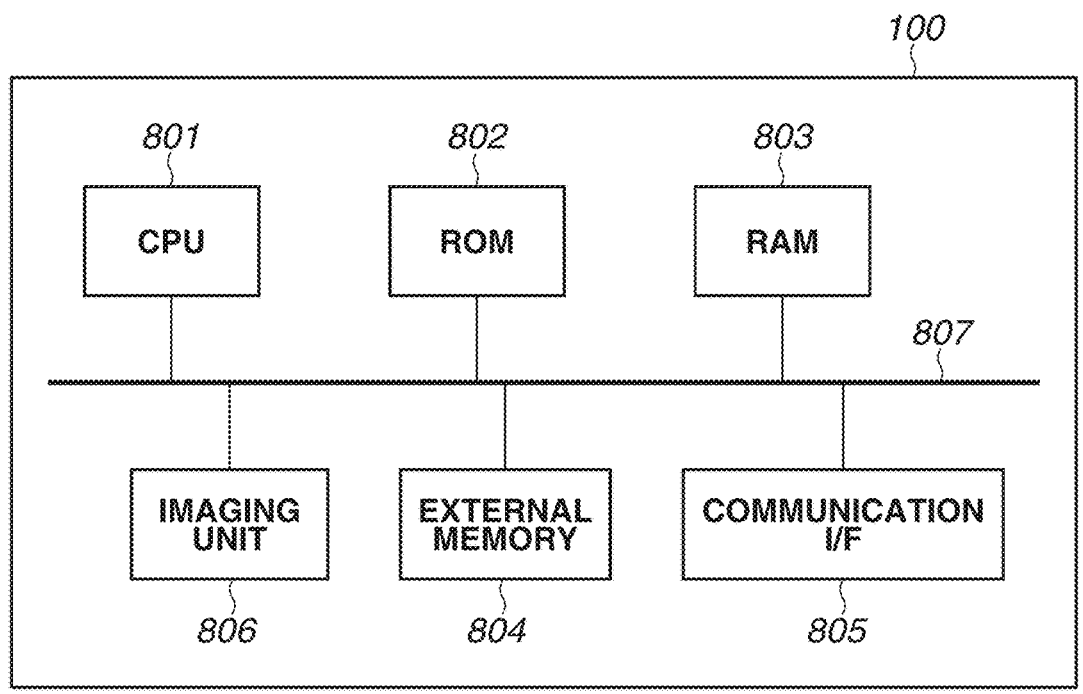
FIG. 2 illustrates a configuration example of hardware of the image processing apparatus according to the exemplary embodiment.

Furthermore, a part or all of the units included in the image processing apparatus 100 may be implemented by an individual piece of hardware or may be implemented by software, and is not specifically limiting in configuration. FIG. 2 illustrates a hardware configuration example of the image processing apparatus 100 in a case where the functions of the image processing apparatus 100 in the present exemplary embodiment are implemented by a hardware configuration including a central processing unit (CPU) and other components.

The image processing apparatus 100 includes a CPU 801, a read-only memory (ROM) 802, a random access memory (RAM) 803, an external memory 804, a communication interface (I/F) 805, an imaging unit 806, and a system bus 807.

The CPU 801 comprehensively controls operations performed in the image processing apparatus 100, thus controlling the components 802 to 806 via the system bus 807.

The ROM 802 is a non-volatile memory that stores control programs required for the CPU 801 to perform processing. Furthermore, the control programs may be stored in the external memory 804 or a removable storage medium.

The RAM 803 functions as, for example, a main memory and a work area for the CPU 801. In other words, the CPU 801 loads, for example, a program required for execution of processing from the ROM 802 onto the RAM 803 and executes the program to implement various functional operations of the image processing apparatus 100 such as those described with reference to FIG. 1.

The external memory 804 stores, for example, various pieces of data or various pieces of information required for the CPU 801 to perform processing using programs. Furthermore, the external memory 804 stores, for example, various pieces of data or various pieces of information acquired by the CPU 801 performing processing using programs.

The communication I/F 805 is an interface configured to communicate with an external device (in the present exemplary embodiment, for example, a display unit or a recording server that is connected to a network). The communication I/F 805 is, for example, a local area network (LAN) interface.

The imaging unit 806 includes a solid-state image sensor, such as a CMOS sensor or a CCD sensor, and is capable of capturing a still image and a moving image under the control of the CPU 801.

The system bus 807 interconnects the CPU 801, the ROM 802, the RAM 803, the external memory 804, the communication I/F 805, and the imaging unit 806 to enable mutual communication.

Next, an operation of the image processing apparatus 100 according to the present exemplary embodiment is described with reference to FIG. 3. FIG. 3 is a flowchart illustrating the operation of the image processing apparatus 100 according to the present exemplary embodiment. In the image processing apparatus 100 according to the present exemplary embodiment, the CPU 801 is capable of executing a program for performing processing illustrated in FIG. 3. Furthermore, in the image processing apparatus 100, a part or all of the functional blocks illustrated in FIG. 1 may be implemented by the respective individual pieces of hardware.

Moreover, the processing illustrated in FIG. 3 is started at timing when the image processing apparatus 100 (for example, a network camera) is powered on. However, the timing of start of the processing illustrated in FIG. 3 does not need to be limited to the timing of power on.

In step S201, the information acquisition unit 105 waits for receiving a request for setting of an image processing region. In the present exemplary embodiment, the request for setting of an image processing region is issued by a client device (the display unit) that is connected to the image processing apparatus 100 via a network. In other words, the information acquisition unit 105 acquires, from the client device via a network, a signal corresponding to an operation performed by the user of the client device. Furthermore, the information acquisition unit 105 provides a user interface to the client device with the use of a web server function, and then acquires the request for setting based on a user operation input via the user interface. However, the method for the information acquisition unit 105 to acquire a request for setting of an image processing region is not limited to the above-described method.

In step S202, the information acquisition unit 105 determines whether the information acquisition unit 105 has acquired a request for setting of an image processing region. If it is determined that the information acquisition unit 105 has acquired the request for setting (YES in step S202), the processing proceeds to step S203. If it is determined that the information acquisition unit 105 has not yet acquired the request for setting (NO in step S202), the processing returns to step S201.

Figure 5A:
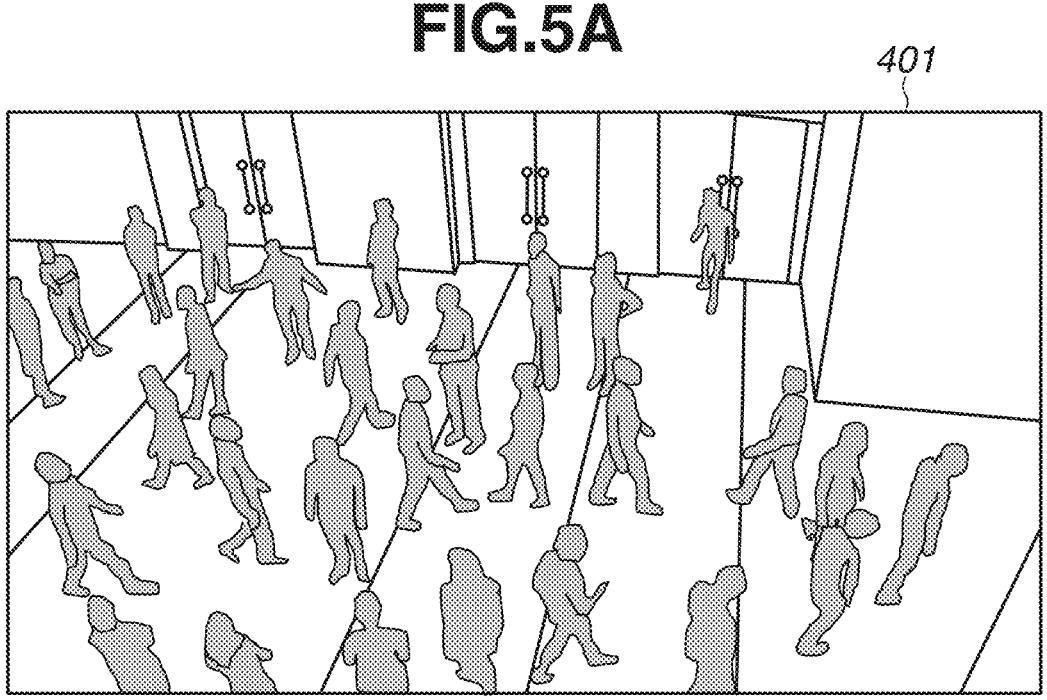
FIGS. 5A and 5B illustrate examples of reference images according to the exemplary embodiment.

In step S203, the image determination unit 108 determines a reference image based on a past image or images (an image frame or frames obtained by past image capturing) recorded on the recording unit 102. The reference image referred to in the present exemplary embodiment is an image displayed on a display screen so as to allow the user to specify an image processing region, for example, an image in which predetermined objects (for example, persons) are densely present at various locations within an image frame. An example of the reference image is illustrated in FIG. 5A.

The reference image can be determined or generated using various methods. The first method is a method to determine, as a reference image, an image frame in which the number of objects (in the present exemplary embodiment, human bodies) is the largest among one or a plurality of image frames recorded on the recording unit 102. However, in a case where there is a plurality of image frames in which the same number of objects have been detected, the image determination unit 108 can determine, as a reference image, an image frame in which the time of image capturing is the latest among the plurality of image frames. Furthermore, the image determination unit 108 can refer to the number of detected objects in order from the latest captured image frame and determine, as a reference image, an image frame in which the number of detected objects is equal to or greater than a threshold value. Thus, the image determination unit 108 determines, as a reference image, an image frame in which the number of detected objects satisfies a predetermined condition.

The number of objects can be detected, for example, by the object detection unit 103 using a head detector. Furthermore, as mentioned in the foregoing, the object is not limited to a human body, and the method for detecting an object is not limited to the method using a head detector. A detector to be used by the object detection unit 103 can be selected according to the type of an object that the user intends to target for detection. Furthermore, the user can specify which type of object is set as an object of interest among, for example, a human body, a face, a kind of animal, and an automobile. Moreover, the user may specify the speed of movement or the size of an object of interest instead of specifying a type of object.

The second method is a method to generate a reference image by combining image frames that were captured at different times. For example, a background image 301 illustrated in FIG. 4A is an image in which no moving object is present. The image determination unit 108 can allow the user to specify a moment when no moving object image is captured and can acquire an image frame captured at that moment as the background image 301. Furthermore, the image determination unit 108 can generate, as the background image 301, an average image or median image of a plurality of previously captured image frames.

FIGS. 4B, 4C, 4D, and 4E illustrate image frames captured at respective certain points of time. Each of the image frames illustrated in FIGS. 4B to 4E indicates the manner in which an object 302 is walking from left to right. The image determination unit 108 calculates a difference between each of the image frames and the background image 301 and obtains a set of pixels in which the difference is larger than a predetermined threshold value, thus extracting a moving object. When determining that a moving object extracted by using an object detector is an object of interest (a human body), the image determination unit 108 superimposes the extracted moving object on the background image 301 to generate a reference image (a superimposed image). In other words, the image determination unit 108 superimposes, on an image frame (the background image 301 illustrated in FIG. 4A), object images corresponding to objects detected from one or more image frames (the image frames illustrated in FIGS. 4B to 4E) including the first image frame (the image frame illustrated in FIG. 4B). In this way, the image determination unit 108 can generate a reference image (a superimposed image). An example of the reference image generated in the above-described way is illustrated in FIG. 4F. Furthermore, the image frame different from one or more image frames may be an image frame input (captured) after the one or more image frames, or may be the background image 301 illustrated in FIG. 4A or another image frame.

FIG. 4F illustrates an example of a reference image (a superimposed image) generated by superimposing, on the background image 301 illustrated in FIG. 4A, object images corresponding to objects detected from the image frames illustrated in FIGS. 4B to 4E. Since the image frame illustrated in FIG. 4F contains more human bodies than the image frames illustrated in FIGS. 4B to 4E, if the image frame illustrated in FIG. 4F is displayed at the time of setting of an image processing region, it becomes easy for the user to specify the image processing region. Furthermore, if objects are detected from image frames more than the image frames illustrated in FIGS. 4B to 4E and object images corresponding to the detected objects are superimposed on the background image 301, a reference image such as that illustrated in FIG. 5A can be generated. The reference image 401 illustrated in FIG. 5A contains more human bodies than those illustrated in FIG. 4F. Accordingly, displaying the reference image 401 illustrated in FIG. 5A advantageously enables the user to more easily set an image processing region.

Moreover, when superimposing objects detected from a plurality of image frames on another image frame, the image determination unit 108 in the present exemplary embodiment is able to determine superimposing positions in such a way as not to overlap the objects in consideration of a distance between each object. Furthermore, when superimposing objects detected from a plurality of image frames on another image frame, the image determination unit 108 is able to determine superimposing positions in such a way that the distance between the centers of the respective objects becomes equal to or greater than a first threshold value. Additionally, when superimposing objects detected from a plurality of image frames on another image frame, the image determination unit 108 in the present exemplary embodiment is able to determine superimposing positions in such a way that the distance between the centers of the respective objects becomes less than a second threshold value. FIG. 5A illustrates an example of a reference image in which objects are superimposed on the background image 301 in such a way that the distance between the centers of the respective objects becomes equal to or greater than the first threshold value and less than the second threshold value. Displaying such a reference image enables the user to more easily specify an image processing region than displaying a reference image in which a region having a multiplicity of objects present and a region having no objects present are mixed together. However, the method for superimposing objects is not limited to the above-described method. For example, objects may be superimposed based only on the first threshold value, or objects may be superimposed based only on the second threshold value.

Furthermore, in the above-described first and second methods, since an object (a human body) specified by the user as an object of interest is directly displayed on a display screen, there may be an issue in terms of privacy. Therefore, the third method for displaying a reference image is considered to generate a reference image while converting an image in an object region into a simple graphic or an avatar (a graphic that represents a human body). More specifically, the image determination unit 108 can generate a reference image by superimposing, on positions within a second image frame corresponding to the positions of objects detected from a plurality of image frames including a first image frame, object images (for example, simple graphics) that represent the detected objects.

Moreover, a reference image may be generated in which object images are silhouetted instead of being converted into a simple graphic or an avatar (a graphic that represents a human body). More specifically, the image determination unit 108 can perform editing processing (silhouette processing) on objects (human bodies) detected by the object detection unit 103 to generate a processed reference image in which the objects are silhouetted. Displaying a reference image in which objects are silhouetted or a reference image in which objects are converted into simple graphics or avatars advantageously enables easily performing setting of an image processing region while protecting the privacy of persons.

Figure 5B:
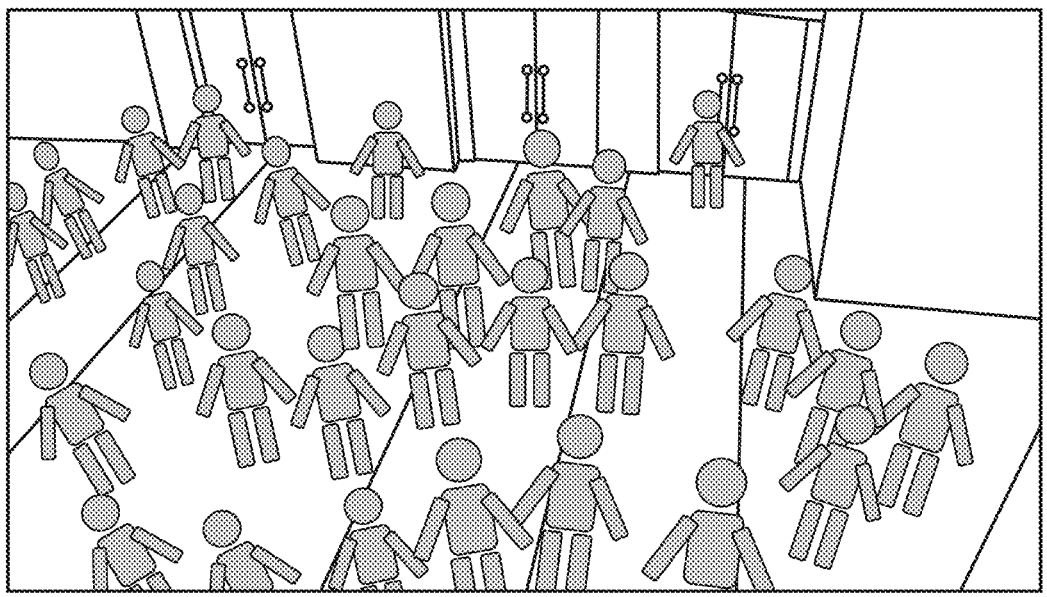

FIG. 5B illustrates an example of a reference image (an abstracted reference image) generated by replacing images of human bodies detected as objects with simple graphics. As illustrated in FIG. 5B, objects detected from image frames are replaced with simple graphics the size of which is approximately the same as that of the objects. The image determination unit 108 in the present exemplary embodiment detects the size or orientation of an object and determines the display size or orientation of a human-shaped simple graphic according to a result of the detection.

Moreover, the object detection unit 103 is able to detect only an object that meets a predetermined condition from an image frame. Furthermore, the image determination unit 108 is able to generate a reference image by superimposing, on another image frame, an object that meets the predetermined condition detected by the object detection unit 103 from an image frame. The predetermined condition includes, for example, the size range, color, and movement speed of an object. For example, in a case where the user specifies a person from 160 centimeters to 180 centimeters tall, the object detection unit 103 can detect human bodies from 160 centimeters to 180 centimeters tall from one or more image frames recorded on the recording unit 102. Then, the image determination unit 108 can generate a reference image by superimposing, on another image frame, human bodies from 160 centimeters to 180 centimeters tall detected by the object detection unit 103.

Furthermore, while the size of a human body can be specified by the user, it may be automatically determined based on, for example, statistics on sizes of human bodies detected from past captured images. Since limiting a target to be superimposed in the above-described way enables reducing a visual variation in objects (objects of interest) contained in the reference image, the user can more easily specify an image processing region. Moreover, in addition to the method for specifying the body height with a numerical value, a method for specifying the size based on a region specified on a display screen on which to display an image frame may be used.

Furthermore, while, in the above description, three methods for displaying a reference image are discussed, a part of these methods may be changed, or a part or all of the three methods can be combined as appropriate.

In step S204, the display control unit 104 displays the reference image determined or generated in step S203 on the display unit. While, in the present exemplary embodiment, it is assumed that the display unit (a client device) is connected to the image processing apparatus 100 via a network, the image processing apparatus 100 and the display unit may be integrated into a single apparatus.

In step S205, the information acquisition unit 105 receives input information from a client device including the display unit. More specifically, the user inputs information required for specifying an image processing region, on which image processing is to be performed, while viewing the reference image displayed in step S204. This information is referred to as "input information". Various methods can be used to specify an image processing region. The format of input information varies according to which specifying method the user employs. Three specifying methods are described below.

Figure 6:
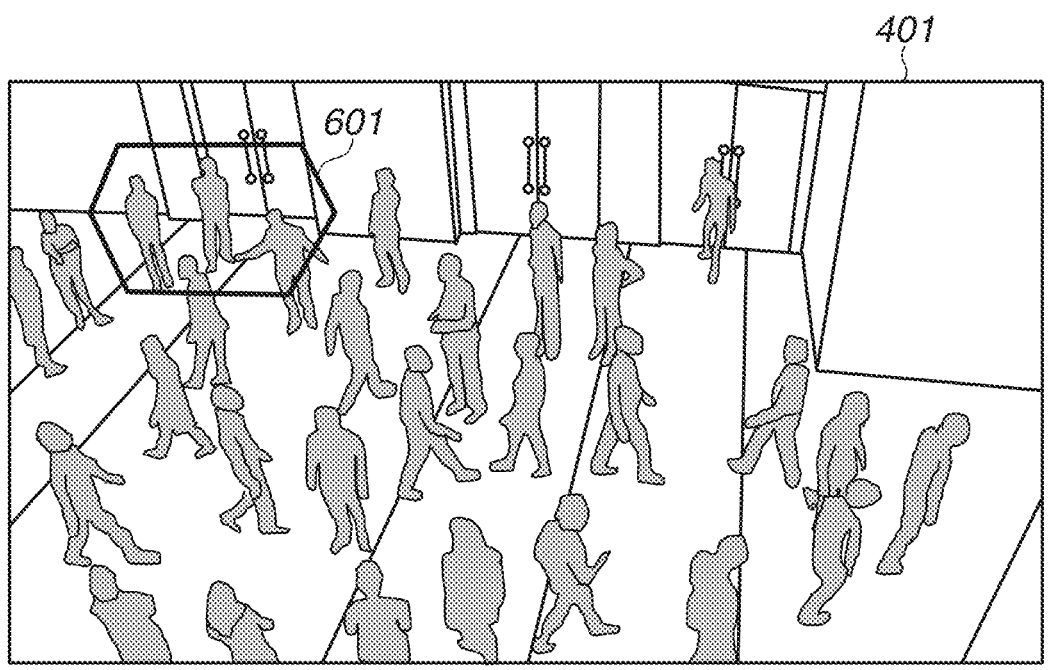
FIG. 6 illustrates an example of a method for specifying an image processing region according to the exemplary embodiment.

The first specifying method is a method to expressly specify an image processing region on the reference image with the use of an input unit, such as a mouse. For example, in a case where a mouse is used as the input unit, the user can specify a closed region in an arbitrary shape while performing dragging with the mouse, thus setting the closed region as an image processing region. Alternatively, the user can select three or more points with the mouse and then specify, as an image processing region, a polygon formed by joining the selected points in order of selection. A closed region 601 illustrated in FIG. 6 indicates an example of a case where an image processing region is identified based on the coordinates of six points selected by the user. Even in a case where the input unit is another interface, such as a touch panel, an image processing region can be specified as with the mouse. In the first specifying method, information for identifying such a closed region is referred to as "input information". When the first specifying method is used, in step S205, the information acquisition unit 105 receives a user input for selecting coordinates in the reference image. Then, in step S206, the region determination unit 106 determines an image processing region according to the user input (coordinates) received by the information acquisition unit 105.

Furthermore, as mentioned in the foregoing, the present exemplary embodiment assumes a case where the image processing region is a closed region and a case where the image processing region is a line segment. The case where the image processing region is a closed region is a case where, for example, passage detection is performed as image processing. In a case where the image processing region is a line segment, the user can specify a line segment by selecting two points on the reference image with, for example, a drag operation of the mouse. Input information in this case is information for specifying a line segment (for example, information on the coordinates of two points).

Moreover, there may be a case where a region in which objects of interest are never detected or almost no object of interest is detected (a nondetection region) exits in past image frames. The nondetection region may be a region which any objects of interest are not allowed to enter or a region in which it is difficult for an object detector to detect objects of interest. In such a case, if the nondetection region is set as an image processing region, the accuracy of image processing by the image processing unit 107 may not be assured.

In order to prevent such a situation, the region determination unit 106 can issue an error notification with respect to the user specifying an image processing region containing a nondetection region and thus cancel the designation of the image processing region. In this case, the user can re-set an image processing region containing no nondetection regions. Furthermore, for example, when receiving the designation of an image processing region containing a nondetection region by the user, the region determination unit 106 can cause a confirmation screen to be displayed and set an image processing region containing a nondetection region according to a user operation on the confirmation screen. Additionally, for example, when receiving the designation of an image processing region containing a nondetection region by the user, the region determination unit 106 can set the image processing region and also issue a warning. The issuance of a warning includes displaying of a warning message, outputting of an alarm, and displaying an image processing region in a color different from an ordinary one.

Thus, if a nondetection region is contained in an image processing region specified by the user operation, the region determination unit 106 can perform at least one of canceling of the designation and outputting of a notification. In this case, the nondetection region is a region with respect to which the number of times that the object detection unit 103 has detected predetermined objects (human bodies) in a predetermined number of image frames is less than a threshold value. With such a configuration, the user can readily recognize that a nondetection region is contained in the image processing region specified by the user.

The second specifying method is a method to allow the user to separately specify, among objects of interest (human bodies) present in the reference image, an object that the user intends to set as an object inside an image processing region and an object that the user intends to set as an object outside the image processing region. In other words, the user can separately specify, among objects in the reference image, an object that is to be targeted for image processing and an object that is not to be targeted for image processing. In a case where the image processing is dwell detection, the user can specify an object that is to be targeted for dwell detection and an object that is not to be targeted for dwell detection.

More specifically, the information acquisition unit 105 can provide a scheme for detecting the user left-clicking or right-clicking on each object of interest present in the reference image, with the use of, for example, a clickable map. According to this configuration, in a case where, for example, the user has left-clicked with the mouse cursor placed on an object, it means that the object has been specified as an object that is to be targeted for image processing. On the other hand, if the user has right-clicked with the mouse cursor placed on a second object, it means that the second object has been specified as an object that is not to be targeted for image processing. However, the method for discriminating whether an object of interest is an object that is to be targeted for image processing is not limited to the method for discriminating between the left click and right click of the mouse.

Figure 7A:
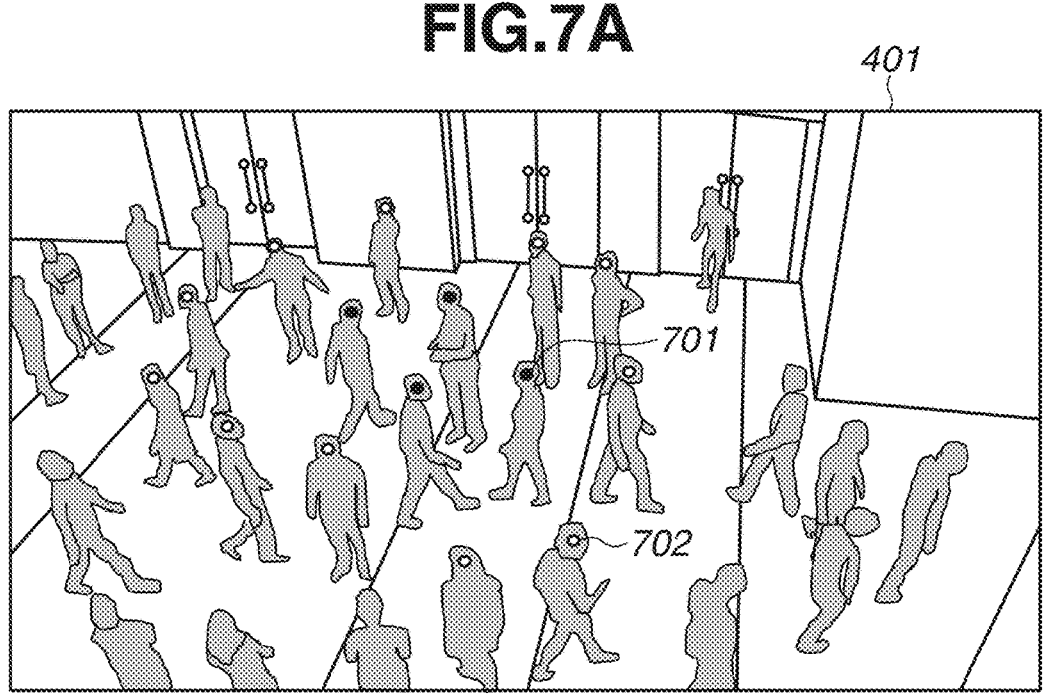
FIGS. 7A and 7B illustrate an example of a method for specifying an image processing region according to the exemplary embodiment.

A filled circle 701 illustrated in FIG. 7A indicates an object specified by the user as an object that is to be targeted for image processing (a processing target object). In addition, an unfilled circle 702 illustrated in FIG. 7A indicates an object specified by the user as an object that is not to be targeted for image processing (a non-processing target object).

In the above-mentioned second specifying method, input information entered by the user is identification information for discriminating between a processing target object and a non-processing target object. The identification information may be any information that is able to be used by the image processing apparatus 100 to identify an object, and is, for example, information on the coordinates of the head of an object or information on the central coordinates of an object. The identification information may be an object identifier (ID).

Thus, the information acquisition unit 105 receives a user input (input information) for specifying an object that is to be targeted for image processing and an object that is not to be targeted for image processing among objects in the reference image displayed on the display screen. Then, the region determination unit 106 determines an image processing region according to the input information received by the information acquisition unit 105. The method for determining an image processing region by the region determination unit 106 is described below.

Moreover, in a case where a line segment is specified as an image processing region, the user can specify an image processing region by specifying two objects. When two objects are specified by the user, a line segment that connects the two objects is specified as an image processing region. The input information in this case can be, for example, information on the coordinates of the heads of the specified two objects or information on the central coordinates of the specified two objects.

The third specifying method is a method in which the user specifies only an object that the user intends to set as an object inside an image processing region among objects of interest (human bodies) present in the reference image. More specifically, the user specifies an object that is to be targeted for image processing (a processing target object) among a plurality of objects in the reference image and does not specify a non-processing target object. In the third specifying method, the input information entered by the user is identification information about a processing target object (for example, information on the coordinates of the head of an object or the central coordinates of an object). Thus, the information acquisition unit 105 receives a user input (input information) for specifying an object that is to be targeted for image processing among objects in the reference image displayed on the display screen. Then, the region determination unit 106 determines an image processing region according to the input information received by the information acquisition unit 105. The method for determining an image processing region by the region determination unit 106 is described below.

In step S205, the information acquisition unit 105 receives input information corresponding to any one of the above-described specifying methods. In step S206, the region determination unit 106 determines an image processing region based on the input information. Since the method for determining an image processing region varies with the formats of input information, the method for determining an image processing region is described for each of the three specifying methods described above in step S205.

The method for determining an image processing region in a case where the first specifying method is used directly uses, as an image processing region, a closed region given as input information. However, the region determination unit 106 can modify an image processing region determined according to the input information. The specific modification method is described below.

Figure 7B:
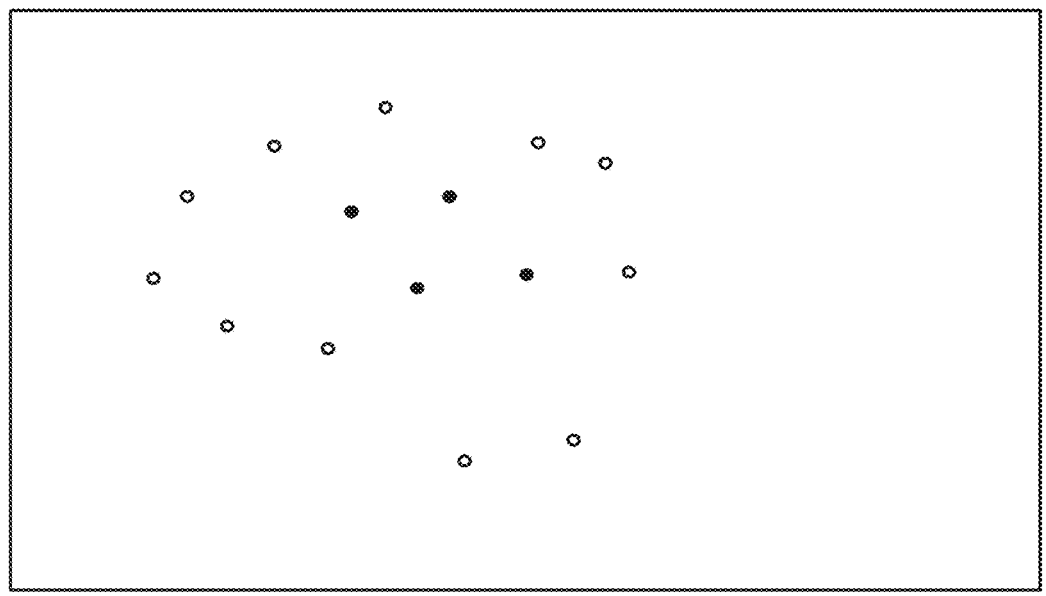
Figure 8:
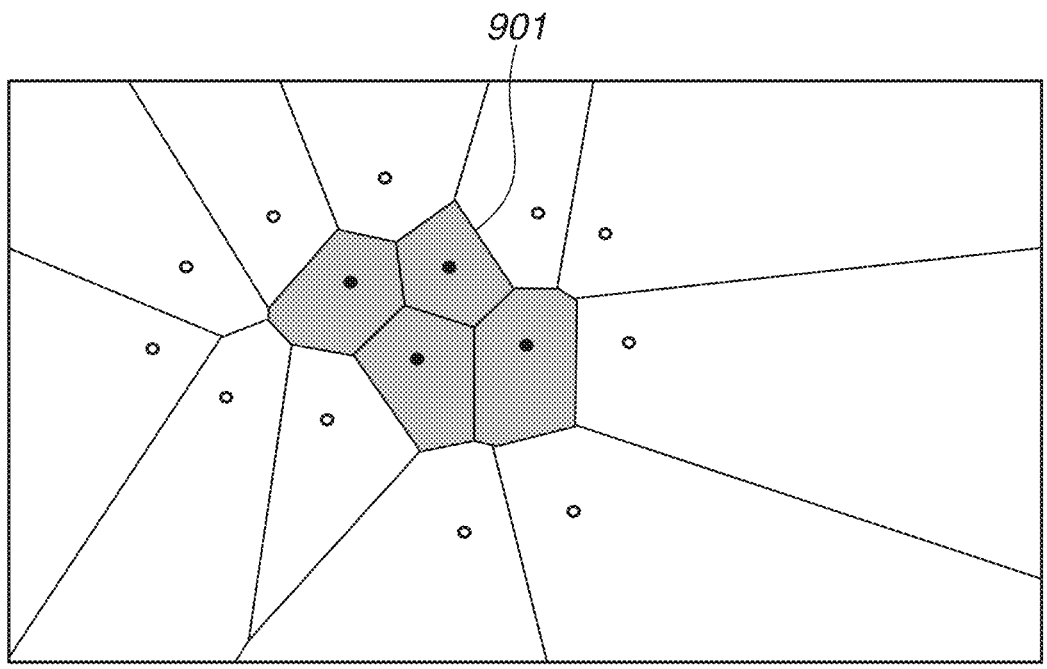
FIG. 8 illustrates an example of a method for determining an image processing region according to the exemplary embodiment.

The method for determining an image processing region in a case where the second specifying method is used is described. The region determination unit 106 can derive a boundary for separating between a processing target object and a non-processing target object using coordinate information for identifying the respective positions of the processing target object and the non-processing target object. Then, the region determination unit 106 can set, as an image processing region, a region to which the processing target object belongs among the regions separated with the boundary. The method for deriving the boundary can use, for example, a Voronoi diagram. FIG. 7B is a diagram illustrating only the coordinates of processing target objects and non-processing target objects. The region determination unit 106 can derive a Voronoi diagram with respect to the union of sets of coordinates of processing target objects and non-processing target objects and thus derive Voronoi regions belonging to the respective elements constituting the union of sets. Then, the region determination unit 106 can determine, as an image processing region, a region formed by joining Voronoi regions belonging to points of the processing target objects. An example of the image processing region obtained in the above method is indicated by a gray region 901 illustrated in FIG. 8. Additionally, the region determination unit 106 can modify the shape of the image processing region obtained in the above method by performing, for example, processing for decreasing the number of vertices on the image processing region.

Furthermore, an image processing region can be obtained by using a two-class discriminator, such as a support vector machine. The region determination unit 106 can learn a boundary that appropriately separates a processing target object and a non-processing target object and determine, as an image processing region, a region to which the processing target object belongs. The method for obtaining an image processing region is not limited to the above-described ones, but may use any arbitrary method.

Figure 9A:
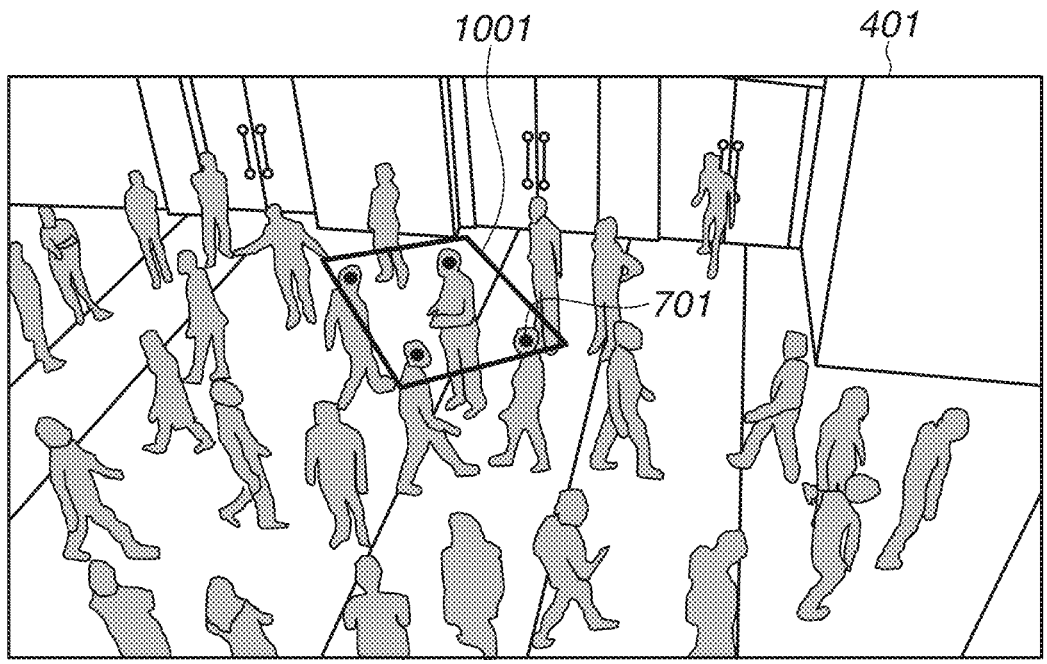
FIGS. 9A and 9B illustrate examples of a method for determining an image processing region and a method for visualizing the determined image processing region according to the exemplary embodiment.

The method for determining an image processing region in a case where the third specifying method is used is described. If, for example, all of the objects that the user does not specify as a processing target object are regarded as non-processing target objects, an image processing region can be determined in a similar manner to the case using the second specifying method. Moreover, as another method, a closed region containing all of the points of objects specified by the user as a processing target object can be obtained using the convex hull, and the obtained closed region can be determined as an image processing region. In this instance, the region of a polygon obtained using the convex hull can be expanded, so that the image processing region can be provided with an extra region. A region 1001 illustrated in FIG. 9A is an example of the image processing region obtained using the convex hull.

Even an image processing region obtained by any one of the above-described image processing region determination methods can be arranged to be manually adjusted by the user. The method for determining an image processing region is not limited to the above-described ones, but can use any arbitrary method. The region determination unit 106 can superimpose the image processing region determined by any one of the above-described methods in step S206 on the reference image 401 and display an image obtained by superimposition to the user.

Figure 9B:
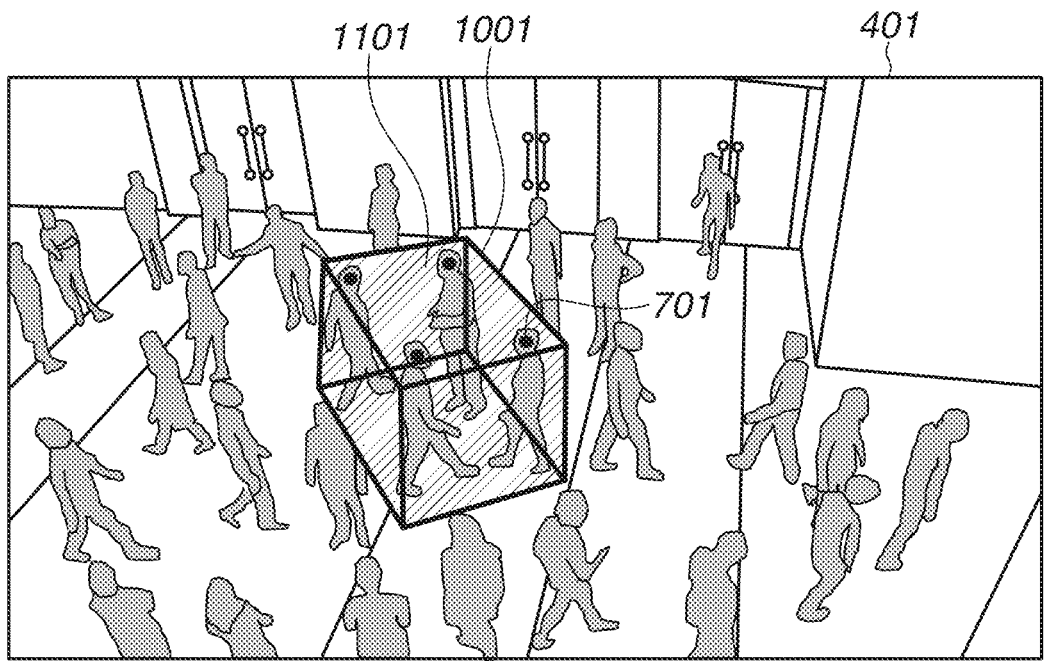

Furthermore, in step S206, when recognizing a region corresponding to a floor in the reference image, the region determination unit 106 can project the image processing region onto the floor and identify the image processing region with a pseudo three-dimensional graphic. Then, the display control unit 104 can display the three-dimensional graphic image processing region identified by the region determination unit 106 on the display unit. A graphic 1101 filled with hatched lines illustrated in FIG. 9B is an example of the three-dimensional graphic image processing region. This display enables the user to accurately understand the range of the image processing region.

In step S207, the region determination unit 106 determines whether the user has completed setting of the image processing region. If the region determination unit 106 determines that the user has completed setting of the image processing region (YES in step S207), the processing proceeds to step S208. If the region determination unit 106 determines that the user has not yet completed setting of the image processing region (NO in step S207), the processing returns to step S203. The image processing apparatus 100 according to the present exemplary embodiment can allow a plurality of image processing regions to be set by the user.

Moreover, during a period until the user completes setting of the image processing region, the image processing apparatus 100 can interactively perform processing from step S203 to step S206. For example, in a case where the second specifying method is used, the region determination unit 106 can redetermine an image processing region each time the user specifies one object as a processing target object or non-processing target object, and can successively display the latest image processing region to the user. The user can adjust input information based on the latest image processing region.

Figure 10A:
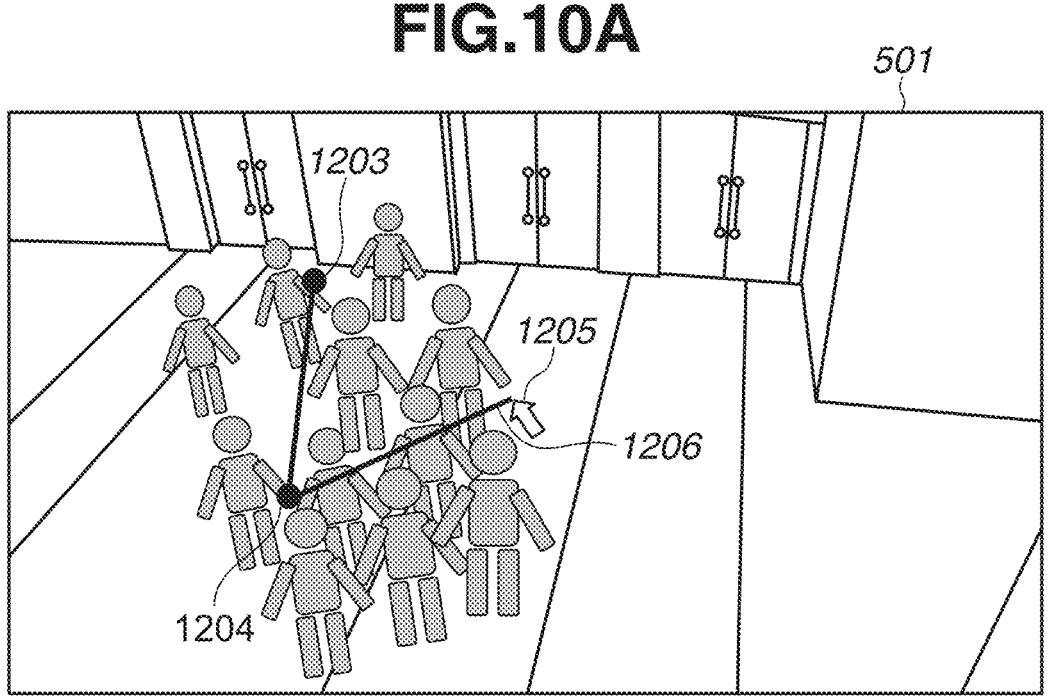
FIGS. 10A and 10B illustrate examples of a method for dynamically changing a reference image according to the exemplary embodiment.
Figure 10B:
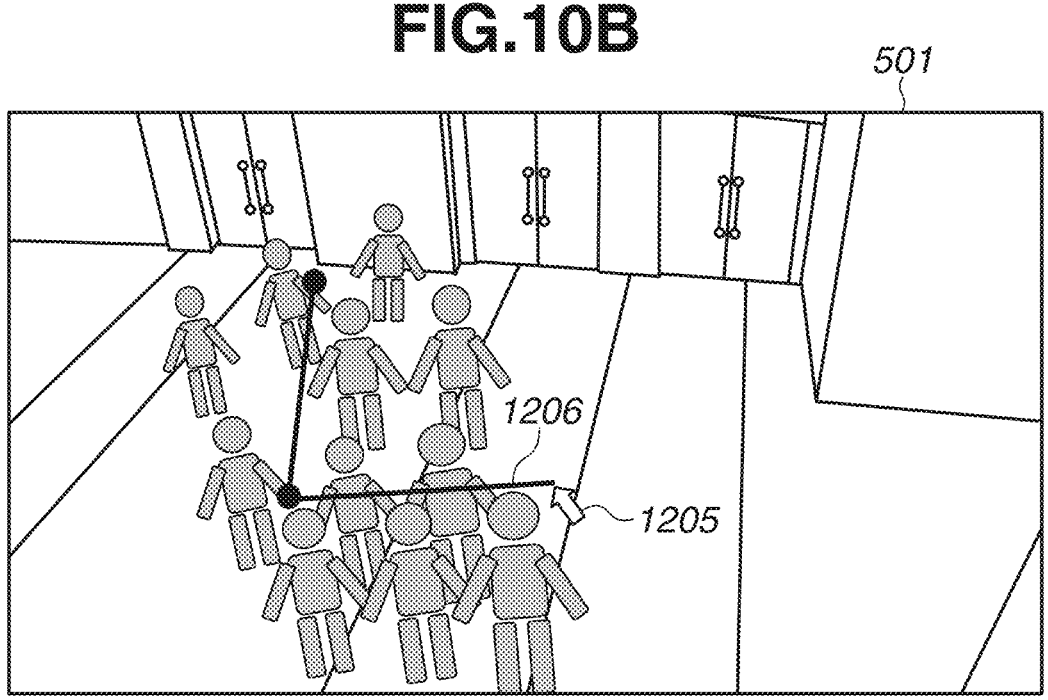

Furthermore, in step S203, interactively generating a reference image according to an operation of the user enables the user to more high-efficiently input information for setting an image processing region. More specifically, in step S205, information associated with an input operation of the user, for example, information on the coordinate values of a mouse pointer operated by the user, is included in the input information. For example, consider a case where the user is going to specify three or more points using the first specifying method (a method for specifying a closed region in the reference image). FIGS. 10A and 10B each illustrate a state in which the user has already finished specifying a point 1203 and a point 1204 and is going to specify the third point with a mouse pointer 1205. FIGS. 10A and 10B each also illustrate a state in which a temporary line segment 1206 serving as the boundary between an image processing region and a non-image processing region is superimposed on the reference image based on the position of the mouse pointer 1205. Additionally, FIGS. 10A and 10B each also illustrate a state in which objects of interest present very close to either side of the temporary line segment 1206 are dynamically superimposed on the reference image. The image determination unit 108 performs a dynamic change of the reference image. More specifically, the image determination unit 108 can acquire input information about a user operation for specifying an image processing region, search another image frame for an object present at the position corresponding to the acquired input information, and superimpose the found object on the reference image. In other words, after the reference image is displayed on the display screen, the image determination unit 108 changes the position of an object in the reference image according to the input condition of a user operation for specifying an image processing region.

In this way, interactively generating a reference image according to an operation of the user enables the user to understand well in which region an object of interest present is contained in the image processing region according to an operation performed by the user. In this instance, if a reference image is generated by superimposing objects of interest on the background image in such a manner that the more distant object of interest from the temporary line segment 1206 or the mouse pointer 1205, the degree of transparency thereof is made higher, unnecessary information can be prevented from being displayed to the user.

Likewise, even in a case where the user specifies an image processing region using the second or third specifying method, the image determination unit 108 can select an object of interest close to the position of the mouse pointer according to the position of the mouse pointer and superimpose the selected object of interest on the background image. Even dynamically generating a reference image in this way enables the user to accurately understand in which region an object of interest present is contained in the image processing region.

In step S208, the image processing unit 107 performs image processing directed to the image processing region determined in step S206. The image processing includes, for example, congestion detection, dwell detection, congestion degree detection, dwell degree detection, passage detection, removed object detection, abandoned object detection, and intrusion detection. Then, the display control unit 104 can display a result of image processing performed by the image processing unit 107 on the display unit connected via a network. The above-described configuration of the image processing apparatus 100 can assist the user in setting an image processing region that is targeted for image processing.

Furthermore, while, in the above exemplary embodiment, an example in which displaying a reference image assists the user in specifying an image processing region has been mainly described, the image processing apparatus 100 can perform the following control operation instead of displaying a reference image or in addition to displaying a reference image. The display control unit 104 of the image processing apparatus 100 can display, on a display screen for setting an image processing region, information about a region of an object that is to be detected for image processing. For example, in a case where the image processing unit 107 performs congestion degree detection as image processing, the display control unit 104 displays an image indicating that congestion detection is performed based on a result of detection of the human head. However, the head may be replaced by, for example, the face, the center of the human body, or the legs. The image can be displayed with a character string, with the only the region of the object, which is related to detection processing among objects in the displayed image, changed in color, or with other methods. In this way, since the user can specify an image processing region upon understanding based on a result of detection of which region of the object the image processing is performed, the user can more accurately specify the image processing region.

Moreover, in a case where the user has expressly specified an image processing region, the image processing apparatus 100 can modify the specified image processing region. More specifically, the region determination unit 106 can modify the specified image processing region based on both information about the region of an object specified by the user and information about the image processing region specified by the user.

For example, in a case where the user has specified an image processing region after specifying the human head, the information acquisition unit 105 acquires input information indicating the region (head) and input information for identifying the image processing region. In this case, the region determination unit 106 can determine that the user has specified the image processing region based on the head of an object (a person). The region determination unit 106 can also acquire, from the image processing unit 107, information indicating upon detecting which region of an object the image processing unit 107 is performing image processing. Then, for example, in a case where the user has specified an image processing region based on the human head and the image processing unit 107 performs image processing based on a result of detection of the human legs, the region determination unit 106 shifts the specified image processing region downward.

On the other hand, in a case where the user has specified an image processing region after specifying the human legs, the information acquisition unit 105 acquires input information indicating the region (legs) and input information for identifying the image processing region. In this case, the region determination unit 106 can determine that the user has specified the image processing region based on the legs of an object (a person). The region determination unit 106 can also acquire, from the image processing unit 107, information indicating upon detecting which region of an object the image processing unit 107 is performing image processing. Then, for example, in a case where the user has specified an image processing region based on the human legs and the image processing unit 107 performs image processing based on a result of detection of the human head, the region determination unit 106 shifts the specified image processing region upward.

Furthermore, the method for the user to specify a region of an object includes, in addition to specifying by directly clicking the region of an object, specifying by an operation on, for example, a radio button. The above-described configuration enables the user to more accurately specify an image processing region without considering based on a result of detection of which region of an object the image processing apparatus 100 is performing image processing.

The above-described configuration in the present exemplary embodiment enables easily specifying an image processing region closer to the intention of the user.

Other Embodiments

Embodiment(s) of aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-037432 filed Feb. 26, 2015, which is hereby incorporated by reference herein in its entirety.

What is claimed is:

1. An image processing apparatus comprising:
one or more processors; and
at least one memory storing executable instructions, which when executed by the one or more processors, cause the image processing apparatus to:
obtain an image captured by an image capturing unit;
determine a reference image based on one or more images captured by the image capturing unit in the past, wherein the reference image is used by a user to set an object detection area or a detection line, the reference image including an object image corresponding to an object detected from the one or more images captured by the image capturing unit;
display the reference image on a display screen;
receive a user input based on a user operation setting an object detection area on a detection line or the reference image displayed on the display screen; and
detect an object in the object detection area or an object that has passed over the detection line in the image captured by the image capturing unit.

2. The image processing apparatus according to claim 1, wherein the instructions, when executed by the one or more processors, cause the image processing apparatus to:
detect an object from an image; and
generate a superimposed image by superimposing an object image corresponding to an object detected from one or more images including a first image from among a plurality of images obtained by obtaining on a second image different from the one or more images,
wherein the instructions, when executed by the one or more processors, cause the image processing apparatus to determine the superimposed image as the reference image.

3. The image processing apparatus according to claim 1, further comprising:
an image sensor,
wherein the obtained image is an image obtained by image capturing performed by the image sensor.

4. The image processing apparatus according to claim 1, wherein the instructions, when executed by the one or more processors, further cause the image processing apparatus to:
detect an object from the image;
determine the reference image based on a result of detection of the object; and
perform editing processing for changing the detected object from the image into silhouette.

5. The image processing apparatus according to claim 1, wherein the user input based on the user operation comprises a user input specifying coordinates in the reference image displayed on the display screen, and
wherein the instructions, when executed by the one or more processors, cause the image processing apparatus to:
determine the object detection area or the detection line according to the user input specifying the coordinates in the reference image.

6. The image processing apparatus according to claim 1, wherein the user input based on the user operation comprises a user input specifying an object that is to be targeted for image processing to be performed in the object detection area from among objects in the reference image displayed on the display screen, and wherein the instructions, when executed by the one or more processors, cause the image processing apparatus to:
determine the object detection area according to the user input specifying the object that is targeted for the image processing.

7. The image processing apparatus according to claim 1, wherein the user input based on the user operation comprises a user input specifying an object that is to be targeted for image processing to be performed in the object detection area and an object that is not to be targeted for the image processing from among objects in the reference image displayed on the display screen, and
wherein the instructions, when executed by the one or more processors, cause the image processing apparatus to:
determine the object detection area according to the user input specifying the object that is targeted for the image processing and the object that is not targeted for the image processing.

8. The image processing apparatus according to claim 1, wherein the instructions, when executed by the one or more processors, further cause the image processing apparatus to:
change a position of the object in the reference image according to an input condition of a user input specifying the object detection area after the reference image is displayed on the display screen.

9. The image processing apparatus according to claim 1, wherein the instructions, when executed by the one or more processors, further cause the image processing apparatus to:
perform, in a case where a non-detection region in which a number of times objects have been detected in a predetermined number of images is less than a threshold value is included in an object detection area specified by a user operation, at least one of canceling the specified object detection area and outputting a notification indicating the non-detection region.

10. The image processing apparatus according to claim 1, wherein image processing performed in the object detection area includes at least one of congestion detection for detecting that objects a number of which is greater than or equal to a threshold value corresponding to an area of the object detection area are present, congestion degree detection for detecting a congestion degree corresponding to a ratio of a number of objects to an area of the object detection area, dwell detection for detecting that a same object continues being present within the object detection area for a time greater than or equal to a predetermined time threshold, dwell degree detection for detection a dwell degree corresponding to a time for which the same object continues being present within the object detection area, removed object detection for detecting that an object has carried away a predetermined object, and abandoned object detection for detecting that an object has deserted a predetermined object.

11. An image processing method comprising:
obtaining an image captured by an image capturing unit;
determining a reference image based on one or more images captured by the image capturing unit in the past, wherein the reference image is used by a user to set an object detection area or a detection line, the reference image including an object image corresponding to an object detected from the one or more images captured by the image capturing unit;
displaying the reference image on a display screen;
receiving a user input based on a user operation setting an object detection area or a detection line on the reference image displayed on the display screen; and
detecting an object in the object detection area or an object that has passed over the detection line in the image captured by the image capturing unit.

12. A non-transitory computer-readable storage medium storing computer executable instructions that, when executed by a computer, cause the computer to perform a method comprising:
obtaining an image captured by an image capturing unit;
determining a reference image based on one or more images captured by the image capturing unit in the past, wherein the reference image is used by a user to set an object detection area or a detection line, the reference image including an object image corresponding to an object detected from the one or more images captured by the image capturing unit;
displaying the reference image on a display screen;
receiving a user input based on a user operation setting an object detection area or a detection line on the reference image displayed on the display screen; and
detecting an object in the object detection area or an object that has passed over the detection line in the image captured by the image capturing unit.

13. The image processing apparatus according to claim 1, wherein the instructions, when executed by the one or more processors, cause the image processing apparatus to:
detect an object from an image; and
determine, as the reference image, an image in which a number of objects detected by the detecting from among a plurality of images obtained by obtaining satisfies a predetermined condition.

14. The image processing apparatus according to claim 2, wherein the superimposed image is generated by superimposing, on the second image, an object image corresponding to an object that falls within a predetermined size range among objects detected from the one or more images.

15. The image processing apparatus according to claim 2, wherein the instructions, when executed by the one or more processors, cause the image processing apparatus to generate the superimposed image by setting an object detected from the one or more images including the first image as the object image and superimposing the object image on the second image.

16. The image processing apparatus according to claim 2, wherein the instructions, when executed by the one or more processors, cause the image processing apparatus to generate the superimposed image by superimposing, on a position in the second image corresponding to a position of an object detected from the one or more images including the first image, an object image that represents the detected object.

* * * * *